Patented Oct. 4, 1932

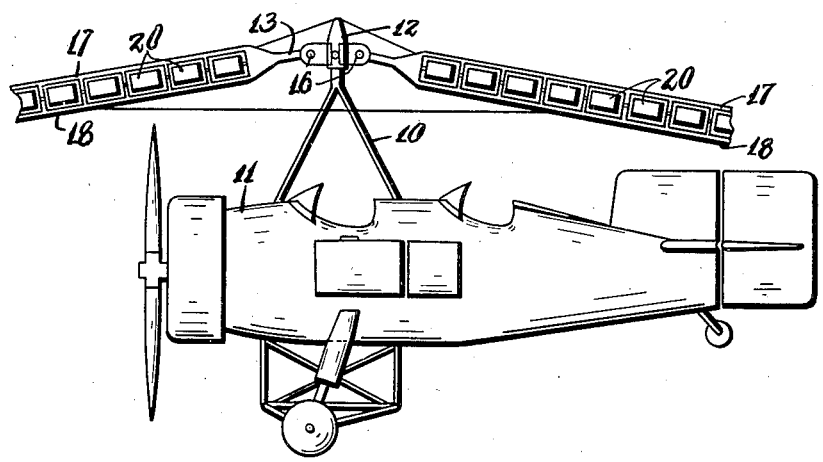
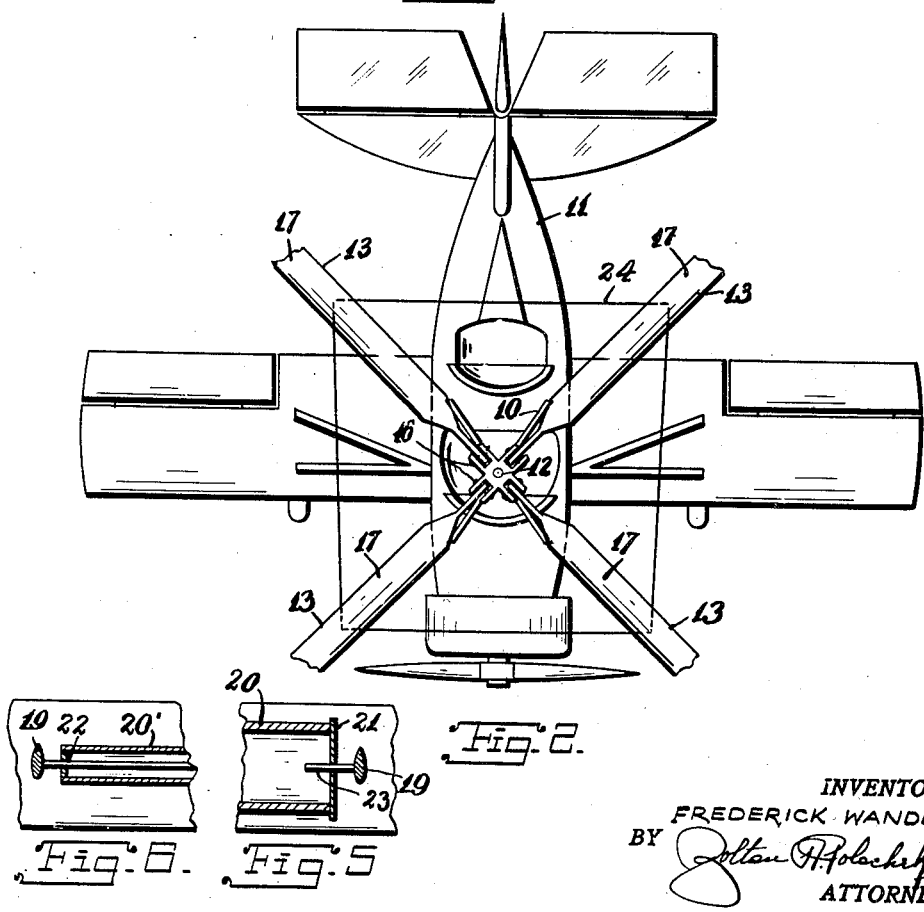

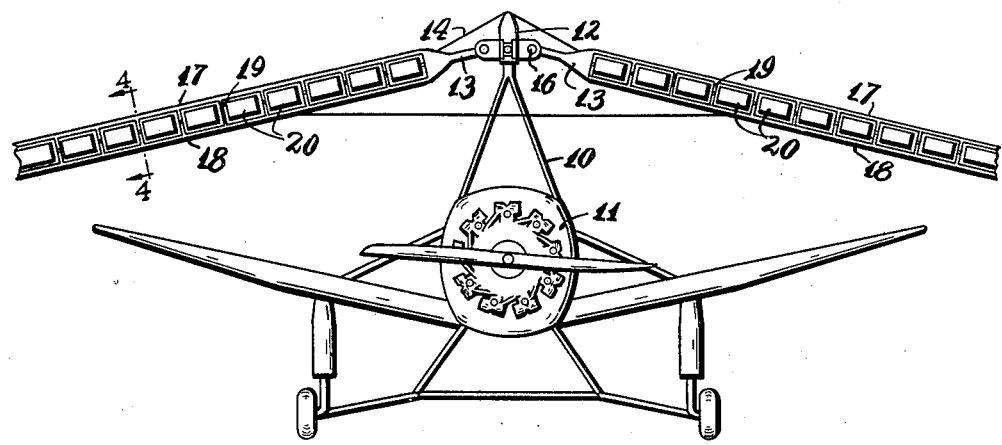
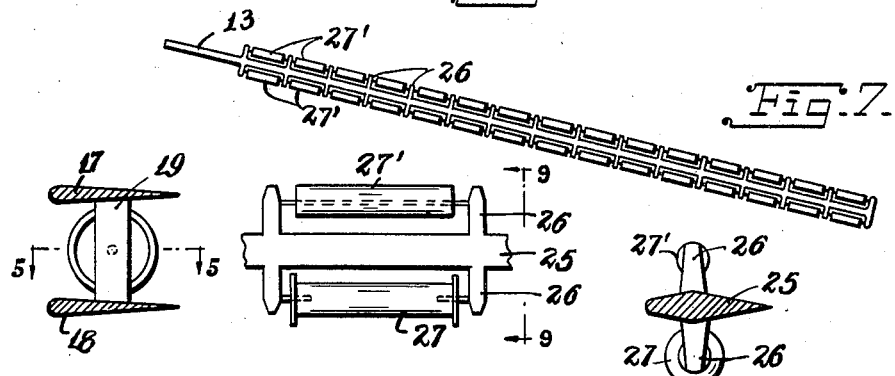
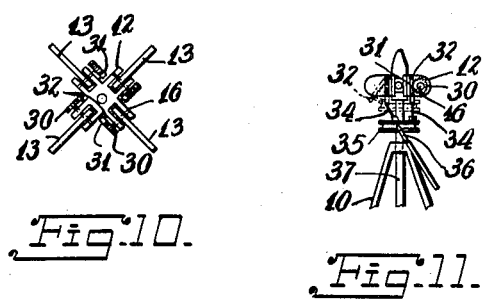

1,880,550

UNITED STATES PATENT OFFICE

FREDERICK WANDER, JR., OF NEW YORK, N. Y.

HELICO-LIFT AUTOROTOR FOR AIRCRAFT AND THE LIKE

Application filed February 4, 1932. Serial No. 590,791.

This invention relates to new useful improvements in an autorotor for airplanes, gliders, boats and the like.

The invention has for an object the construction of an autorotor which is characterized by a plurality of arms supporting a plurality of small rotors in end aligned relation, and said arms being streamlined to lessen the air resistance of the autorotor and to increase the efficiency of the rotors.

As a still further object of this invention it is proposed to rotatively support a member from which the plurality of arms are hingedly supported so that they may move within limits controlled by braces from a position slightly below the horizontal upwards.

As a still further object of this invention it is proposed to construct the arms with upper and lower streamlined portions connected by vertical streamlined portions and to arrange the rotors in between the spaces formed by these portions.

Furthermore, as another embodiment, it is proposed to construct the arms from a central streamlined portion having a plurality of upward and downward projections and to rotatively support the rotors by these projections.

Furthermore, it is proposed to provide means for latching the arms in various inclined adjusted positions.

The invention has for a still further object the construction of a device of the class described which is of simple durable construction, dependable in use and efficient in operation and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a plane equipped with an autorotor according to this invention.

Fig. 2 is a plan view of Fig. 1.

Fig. 3 is a front view of Fig. 1.

Fig. 4 is a sectional view taken on the line 4—4 of Fig. 3.

Fig. 5 is a fragmentary sectional view taken on the line 5—5 of Fig. 4.

Fig. 6 is a view similar to Fig. 5 but showing a modification.

Fig. 7 is a fragmentary view similar to a portion of Fig. 3 but illustrating a modification of the autorotor.

Fig. 8 is a fragmentary enlarged detail view of a portion of Fig. 7.

Fig. 9 is a sectional view taken on the line 9—9 of Fig. 8.

Fig. 10 is a fragmentary view similar to a portion of Fig. 2 but illustrating a modification of the invention.

Fig. 11 is a fragmentary elevational view looking in the direction of the line 11—11 of Fig. 10.

The autorotor, according to this invention, is shown supported upon a bracket 10 mounted upon the top of an airplane 11. The bracket 10 could be mounted advantageously upon a glider, boat or any other similar contrivance. The details of the plane 11 will not be gone into since they form no part of this invention and can be generally recognized from the drawings. A member 12 is rotatively supported on the top of the support bracket 10. A plurality of arms 13 are hingedly mounted on the member 12 so as to swing in vertical planes. Any number of arms 13 may be provided as for example four, shown on the drawings. Braces 14 are extended between the member 12 and the arms 13 so as to limit pivoting of the arms downwards. These braces preferably should be wire or any other construction which allows the arms 13 to move upwards. The bracket 12 is formed in the shape of a cross, as may be clearly seen in Fig. 2, and each of the arms of the cross is formed with recesses 15 into which the ends of the arms 13 engage. Pintle pins 16 through the arms of the cross and the arms 13 accomplish the pivotal connecting of these parts.

Each of the arms 13 is designed so as to be streamlined. More particularly as shown in Figs. 3, 4 and 5, the arms are composed of substantially horizontal upper and lower portions 17 and 18 respectively joined by spaced vertical portions 19. Each of these portions are streamlined as illustrated in Figs. 4 and 5. A plurality of rotors 20 are arranged in end aligned relation with each other and in between the portions 17, 18 and 19 of the arms. More particularly, each of the rotors are rotatively mounted coaxially adjacent portions 19 so as to be disposed in between the portions 17 and 18. The rotors 20, as shown in Fig. 5, are provided with flanges 21. In Fig. 6 a modified arrangement of rotor has been disclosed which is indicated by reference numeral 20′ and has no end flanges. In addition, a shaft 22 extends completely through the rotor 20′ between the portions 19 to accomplish the rotative supporting of the rotors. In Fig. 5 small pintle studs 23 project from the portions 19 partially into the ends of the rotors 20 to accomplish the rotative supporting thereof. Braces 24 are arranged between the arms 13 for the purpose of connecting them more or less in a rigid unit. These braces do not hinder vertical motion of the arms but serve to reinforce them against lateral stresses.

In Figs. 7, 8 and 9, a modified form of rotor arm has been disclosed which consists of a central portion 25 which is streamlined and which is provided with a plurality of upward and downward spaced projections 26. Rotors 27 and 27′ are rotatively mounted between the projections 26 and in end aligned relation with each other. Thus, the particular arm is provided with a double line of the rotors 27 and 27′. These latter rotors distinguish from each other in that the rotors 27 are provided with flanges.

While one set of arms 13 has been shown, it should be borne in mind that a second set may be arranged above the first set or any number that may be desired. The autorotor may be motor driven or wind driven. The rotors of the arms illustrated on the drawings are shown of the same diameter but in practice they may be different sizes, as for example, decrease progressively from the inner to the outer end of the arms.

In Figs. 10 and 11 another embodiment of the invention has been disclosed in which a means is provided for latching the arms which compose the autorotor in various vertical positions. More particularly, each of the arms 13 is fixed upon the pintle pins 16 which are rotative in the arms of the cross bracket 12. One of the ends of each of the pins extends and a disc 30 is rigidly mounted thereon. This disc is formed with a plurality of peripheral teeth engageable with the teeth of a lever 31 hingedly mounted at the top end 32 upon the arm of the bracket 12. The levers are arranged to swing out of mesh with the teeth of the disc 30 as indicated by the dot and dash lines 33. Connecting links 34 pivotally connect each of the levers 31 with a collar 35 free upon a shaft 36 which accomplishes the rotative supporting of the bracket 12 on the support 10. A fork member 37 engages a groove on the collar 35 and extends down to the airplane where it may be moved by the operator according to the requirements of the flight. As the collar 35 is moved upwards each of the levers 31 will disengage from the teeth of the discs 30 and then the arms 13 may be adjusted to various positions. After the adjustment, the collar 35 should be moved downwards again to cause the levers 31 to engage the teeth of the discs 20 and latch the arms in the new positions.

The main feature in the operation of the autorotors consists in the arrangement of the streamlined arms which support the plurality of small rotors. The streamlined arrangement serves to cut down air resistance of the autorotor and at the same time serves to guide the air to the small rotors for the efficient operation of the device.

It is to be understood that the rotors may be of any suitable type or design in cross section; also the size of the rotors may be of any desired length and diameter. In other words any type of rotor may be used in connection with my improved autorotor device.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, and a plurality of rotors in end alignment with each other mounted upon said arms.

2. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, and a plurality of rotors in end alignment with each other mounted upon said arms, said member being in the form of a cross and each of the arms of the cross being recessed for receiving the inner ends of the arms of said plurality of arms.

3. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, and a plurality of rotors in end alignment with each other mounted upon said arms, said member being in the form of a cross and each of the arms of the cross being recessed for receiving the inner ends of the arms of said plurality of arms, and pintle pins engaging through the arms of the cross of the said arms to accomplish the hinged connection of the latter elements.

4. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, and a plurality of rotors in end alignment with each other mounted upon said arms, said braces being connected by the said members and said arms.

5. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, a plurality of rotors in end alignment with each other mounted upon said arms, and braces connected between said plurality of arms.

6. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, and a plurality of rotors in end alignment with each other mounted upon said arms, each of said arms being composed of parallel upper and lower portions of streamlined cross section held in spaced relation by connecting portions also streamlined in cross section, and said rotors being mounted between said parts.

7. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, and a plurality of rotors in end alignment with each other mounted upon said arms, each of said arms being composed of parallel upper and lower portions of streamlined cross section held in spaced relation by connecting portions also streamlined in cross section, and said rotors being mounted between said parts, each of said rotors being rotatively supported between the portions connecting the top and bottom portions.

8. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape and a plurality of rotors in end alignment with each other mounted upon said arms, each of said arms comprising a central portion streamlined in cross section and provided with a plurality of projections to the top and bottom, and rotors mounted between said projections.

9. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, and a plurality of rotors in end alignment with each other mounted upon said arms, each of said arms comprising a streamlined central portion having projections, and said rotors being mounted between said projections.

10. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape and a plurality of rotors in end alignment with each other mounted upon said arms, and means for locking said plurality of arms in various vertical adjusted positions.

11. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, a plurality of rotors in end alignment with each other mounted upon said arms, and means for locking said plurality of arms in various vertical adjusted positions, comprising discs fixed coaxially with the pivoted points of said arms, levers hingedly mounted upon said member and having teeth engaging teeth upon the periphery of said discs, and means for moving said levers so that the teeth disengage.

12. An autorotor for airplanes, gliders, boats and the like comprising a support bracket for attachment upon the top of the vehicle, a member rotative on the top of said support bracket, a plurality of arms hingedly connected upon said member for moving in the vertical, flexible braces for limiting downward motion of said arms to positions slightly below the horizontal, each of said arms being streamlined in shape, a plurality of rotors in end alignment with each other mounted upon said arms, and means for locking said plurality of arms in various vertical adjusted positions, comprising discs fixed coaxially with the pivoted points of said arms, levers hingedly mounted upon said member and having teeth engaging teeth upon the periphery of said discs, and means for moving said levers so that the teeth disengage, said latter means including a collar carrying links connected with said levers.

In testimony whereof I have affixed my signature.

FREDERICK WANDER, Jr.